Nov. 1, 1932. C. W. P. HEYLANDT Re. 18,646

METHOD AND APPARATUS FOR PREPARING COMPRESSED GASES

Original Filed Aug. 24, 1928

INVENTOR
Christian Wilhelm Paul Heylandt
BY
Watson, Bristol, Johnson & Leavenworth
ATTORNEYS Reissued Nov. 1, 1932

Re. 18,646

UNITED STATES PATENT OFFICE

CHRISTIAN WILHELM PAUL HEYLANDT, OF BERLIN-BRITZ, GERMANY, ASSIGNOR TO FLUGA AKTIENGESELLSCHAFT, OF ST. MORITZ, SWITZERLAND, A CORPORATION OF SWITZERLAND

METHOD AND APPARATUS FOR PREPARING COMPRESSED GASES

Original No. 1,773,140, dated August 19, 1930, Serial No. 301,886, filed August 24, 1928, and in Germany September 20, 1927. Application for reissue filed June 24, 1932. Serial No. 619,117.

This invention relates to a method and apparatus for preparing compressed gas of relatively high pressure from a body of liquefied gas held in an insulated container of the pressure variety, and has for its object generally to provide a procedure and suitable means for carrying the same into effect, by which uniform and adequate generation of gas at a desired pressure, for example one higher than the critical pressure is readily obtained.

A further object of the invention is to provide a suitable method and means whereby the gases given off by a body of liquid within an insulated pressure container may be heated and then brought into heat-interchanging relation with said body in order to raise the pressure in the container and accelerate the evaporation of liquid and the withdrawal of gas material in both the liquid and gas phases.

A still further object is to provide a suitable step and appropriate means for quickly preparing compressed gas at a desired pressure, for example compressed oxygen, from gas material in the liquid phase held in containers for liquefied gases of the character shown in my application Serial No. 224,268, filed October 5, 1927.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention, reference should be had to the following detailed description taken in connection with the accompanying drawing, in which.

The containers or pressure vessels usually employed in preparing compressed gases operate satisfactorily up to the critical pressure of the particular liquefied gas which is to be evaporated and converted into compressed gas, so that any desired quantity of compressed gas can be withdrawn at constant pressure either continuously or intermittently. Such devices, however, are built and used to withstand a working pressure which lies below the critical pressure of the particular liquefied gas to be evaporated. The reason for this is, that below the critical pressure there is in the inner container, during the whole period of evaporation, liquid such as is required for preparing the compressed gas.

The conditions change, however, as soon as it is arranged to produce highly compressed gas at about 150 to 200 atmospheres; since it then becomes necessary to exceed the limit of critical pressure (52 atmospheres for oxygen) having regard to the dimensions of the vessel for the compressed gas necessitated by the pressure. In such case, a constant working pressure cannot be maintained, as the pressure chamber is not filled with liquid, and only very cold vapours having a high saturation point pass into the evaporating coil. As a result, no more liquid is evaporated in the heating coil; instead, cold gas will be superheated with consequent fall in pressure.

In the practice of the present invention, a body of liquefied gas is enclosed in a suitable insulated container and the gas, given off from the gas material withdrawn, is heated by passing the same through an environment adapted to supply heat, for example by passing the same through an insulating environment in such a manner that the temperature rise is substantially coincident with temperature increase in the insulating envelope as taught in my said application Serial No. 224,268. The heated gas is then brought into heat exchanging relation with the main body of liquid whereby increased pressure is produced in the container to accelerate the withdrawal of fluid. The gas thus passed in heat exchanging relation with the main body of liquid is of course cooled in this portion of the withdrawal passage, and it may thereafter be reheated in order to provide the pressure desired. Such subsequent heating, however, is not essential to the practice of the invention.

Figure 1:
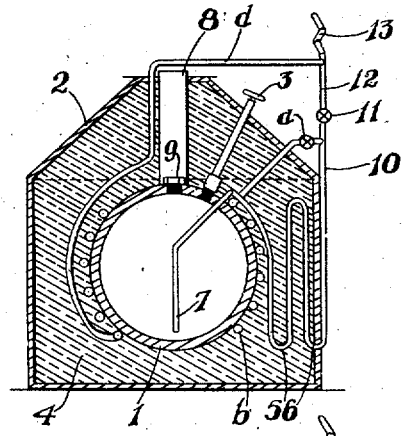
Fig. 1 is a central vertical section showing the construction of apparatus suitable for the practice of the invention.

Referring to the drawing and particularly to Fig. 1, a container is shown as having an inner or pressure vessel 1, which is adapted to receive and hold, in thermally insulated condition, a desired body of liquefied gas. The container also has an outer casing or envelope 2 disposed about and spaced from the vessel 1, the intervening space being substantially filled with a suitable insulating material, as indicated at 4. The vessel 1 is provided with a filling opening which is normally closed by suitable means, for example a screw plug, as shown at 9; access thereto from without the casing 2 being provided through a neck 8 extending upwardly from the vessel 1 through the insulating material to the outside atmosphere. Thus when the container is to be filled, the plug 9 is removed by a suitable tool, for example a socket wrench inserted through the neck 8.

At a suitable point in the wall of the vessel 1 is introduced a withdrawal conduit 7 which is disposed to have its lower end extending in close proximity to the bottom of the vessel 1 while its upper end communicates with a main conduit having a series of convolutions or coils 5, 6, that are disposed within the insulating envelope, and finally pass through the casing 2 to the outside. The inner end of this main conduit is in communication with the gas space in the upper portion of the vessel 1 through an opening controlled by a suitable valve, for example a needle valve, as shown at 3. The outer exposed portion 10 of this main conduit communicates with other portions, for example as shown at 12 and 13, which lead to consuming apparatus, such as a gas receiver (not shown in the interests of clearness). A valve 11 is preferably provided to control communication between the portion 10 and the portions 12 and 13.

In order to pass the gas, heated by its passage through the main conduit, in heat exchanging relation with the body of liquefied gas in the vessel 1, a coil *b* is provided in thermally conducting relation with the contents of the vessel 1. This is here shown as accomplished by forming the coil *b* into a series of convolutions disposed about and in contact with the wall of vessel 1; one end of the coil *b* being connected with the portion 10 of the main conduit and controlled by a valve, as shown at *a*, the other end being connected by way of a connection *d* with a more remote portion of the main conduit, for example that shown at 12. The heating coil *b* thus has communication with the main conduit on both sides of the valve 11. The gas thus cooled in the coil *b* may be reheated in the portion 13 of the main conduit when desired.

In operation, with the valve 11 closed and the valves *a* and 3 open, the gas above the level of the liquid in the vessel 1 will flow into the convolutions 5, 6 and become heated by passing through the insulation and exposed portion 10; thereafter it passes through valve *a* into the coil *b* thereby heating the vessel 1. The gas, after thus giving up its heat, passes from the coil *b* through connection *d* to the portion 12 of the main conduit whence it may be passed directly to its desired destination, reheating being accomplished in the portion 13 if desired. On the other hand, with the valves 11 and 3 closed and the valve *a* open, vaporization will still occur within the vessel 1 owing to the leaking of heat through the insulation. The vapor thus produced will create pressure within the receptacle, whereby the liquid will be forced out through conduit 7, convolutions 5, 6 where it is converted into vapor, and passed into exposed portion 10, where it is superheated by the heat of the atmosphere, and passes through valve *a*, coil *b*, and connection *d* to the remote portion 12 of the main conduit.

When it is desired to discontinue the operation of the apparatus, the valve *a* is closed and valves 3 and 11 opened, whereupon only a small normal evaporation of the liquefied gas will occur.

Figure 2:
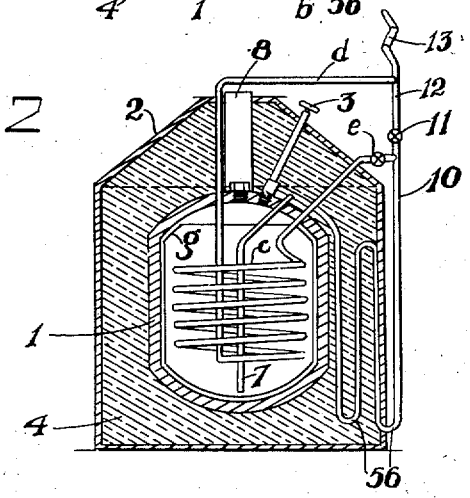
Fig. 2 is a similar view showing a modified form of apparatus.
Figure 3:
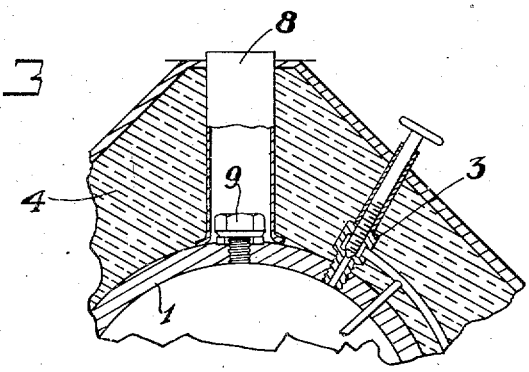
Fig. 3 is an enlarged fragmentary sectional view showing details of the control valve employed in connection with apparatus of the present invention.

In the modified form of container shown in Fig. 2, there is an inner vessel 1 within an outer casing or envelope 2, the intervening space being substantially filled with insulating material 4. In this form of device the vessel 1 has a thin-walled inner receptacle or basket *g* which is disposed in spaced relation to the inner wall of the vessel 1, there being communication between the space within the receptacle and that without, between it and the inner wall of the vessel 1. This receptacle here holds the body of liquefied gas, and owing to its small mass is cooled comparatively quickly by the liquefied gas first introduced, so that evaporation during the filling operation is relatively small. A withdrawal conduit 7 communicating with a main conduit having portions 10, 12 and 13, as in Fig. 1, is also provided.

In order to provide for the generation of pressure within the vessel 1 in this form of container, the heat exchange between the heated gas and the body of liquefied gas in the vessel is accomplished by providing a heating coil, as shown at *c*, within the vessel disposed so as to be immersed in the body of liquid. This coil is also arranged to communicate with the main conduit on both sides of the flow controlling valve, here shown at 11; admission of fluid to the inlet end of coil *c* being controlled by a valve *e*, similar to that shown at *a* in Fig. 1.

The operation of this second form of container is similar to that described above for Fig. 1, except that here the valve *e* is manipulated instead of valve *a*.

While the main conduit is here disclosed as heated by heat exchanged between the conduit and its insulating environment, it is obvious that the heat for achieving this effect may be supplied from other sources.

The method herein described is particularly well adapted for the handling of oxygen. This statement, however, is not to be understood as a limitation, as I am well aware that the method can be applied to all liquefiable gases.

Having described my invention, what I claim as new and desire to secure by Letters Patent, is:

1. The method of preparing compressed gas from a body of liquefied gas held in an insulated container which comprises causing the withdrawal of gas material from said container by first passing the same through a temperature environment which heats the same, and then passing the same in heat exchanging relation with said body of liquefied gas.

2. The method of preparing compressed gas from a body of liquefied gas held in an insulated container which comprises causing the withdrawal of gas material from said container by first passing the same through a temperature environment which heats the same, then passing the same in heat exchanging relation with said body of liquefied gas, and thereafter reheating said gas material.

3. The method of preparing compressed gas having a desired pressure from a body of liquefied gas, held in an insulated container, which comprises discharging gas material from the gas phase to gas consuming apparatus when the pressure in said container exceeds a desired working pressure, and discharging gas material from the liquid phase in heat-exchanging relation with a source of heat when the pressure in said container is lower than said working pressure.

4. The method of preparing compressed gas having a desired pressure from a body of liquefied gas, held in an insulated container, which comprises discharging gas material from the gas phase to gas consuming apparatus when the pressure in said container exceeds a desired working pressure, discharging gas material from the liquid phase through regasifying means when the pressure in said container is lower than said working pressure, and vaporizing a portion of the liquefied gas by bringing the same into thermal contact with the heated gas material that is being discharged.

5. The method of preparing oxygen in the gas phase at a desired pressure in excess of atmospheric from oxygen in the liquid phase, held in a container insulated against the uncontrolled in-put of heat, which comprises withdrawing oxygen in the gas phase at the instant pressure from the space above the liquid level in said container, heating the oxygen withdrawn in the gas phase at a point not in heat-exchanging relation with oxygen in the liquid phase, passing the gaseous oxygen thus heated in heat-exchanging relation with the oxygen in the liquid phase to accelerate evaporation of the latter, and supplying the oxygen thus evolved in the gas phase in said container to consuming apparatus.

6. The method of preparing oxygen in the gas phase at a desired pressure in excess of atmospheric from oxygen in the liquid phase, held in a container insulated against the uncontrolled in-put of heat, which comprises withdrawing oxygen in the gas phase at the instant pressure from the space above the liquid level in said container, heating the withdrawn gaseous oxygen at a point external to said container, passing said heated gaseous oxygen in heat-exchanging relation with the liquid oxygen in said container to accelerate evaporation of liquid oxygen in said container, thereafter reheating said gaseous oxygen, and supplying the same to consuming apparatus.

7. The method of preparing oxygen in the gas phase at a desired pressure in excess of atmospheric from oxygen in the liquid phase, held in a container insulated against the uncontrolled in-put of heat, which comprises withdrawing oxygen in the gas phase at the instant pressure from the space above the liquid level in said container, automatically building pressure within said container by passing heated gaseous oxygen in heat-exchanging relation with the liquid oxygen in said container, and thereafter withdrawing oxygen in the gas phase for supplying gas consuming apparatus.

8. The method of preparing compressed gases of high pressure from a body of liquefied gas enclosed in an insulated container which consists in heating gases given off by said liquid, then bringing said heated gases into heat interchanging relation to said body of liquid, whereby the pressure in the container is raised and the evaporation of the liquid is accelerated, and then further heating said gases and conducting them under the high pressure to the point of use.

9. The method of preparing compressed gases of high pressure from a body of liquefied gas enclosed in an insulated container which consists in subjecting gases given off by said liquid to the temperature of the surrounding atmosphere thereby to heat the gases, then conducting said heated gases into heat interchanging relation to said body of liquid thereby to raise the pressure in the container and accelerate evaporation of the liquid, and then further heating said gases and conducting them under the high pressure to the point of use.

10. Apparatus for preparing compressed gas, comprising an insulated container having an inner vessel for holding a body of liquefied gas, a withdrawal conduit leading from said inner vessel and disposed to be heated by its temperature environment, and a coil connected to said conduit and disposed to be in heat exchanging relation with the contents of said vessel.

11. Apparatus for preparing compressed gas, comprising an insulated container having an inner vessel for holding a body of liquefied gas, a withdrawal conduit leading from said inner vessel and disposed to be heated by its temperature environment, and a heating coil connected to said conduit and disposed in said inner vessel so as to be immersed in the liquid contents thereof.

12. Apparatus for preparing compressed gas, comprising an insulated container having an inner vessel for holding a body of liquefied gas, a withdrawal conduit leading from said inner vessel and disposed in heat exchanging relation with its temperature environment, flow controlling means in said conduit, and a heating coil for said vessel having its ends attached respectively to the main conduit at each side of said flow controlling means.

13. Apparatus for preparing compressed gas, comprising an insulated container having an inner vessel for holding a body of liquefied gas, a withdrawal conduit communicating with both the gas space and liquid space of said vessel leading through the insulation of said container and formed with a portion arranged to be heated, and a pipe connection connected to said conduit arranged to be traversed by the withdrawn gas material and provided with a portion extending into the liquid space of said vessel.

14. Apparatus for preparing compressed gas, comprising an insulated container having an inner vessel for holding a body of liquefied gas, a withdrawal conduit communicating with said vessel leading through the insulation of said container and formed with a portion arranged to be heated, flow controlling means in said conduit adjacent said heated portion, and a pipe connection provided with a portion disposed in heat exchanging relation with the liquid in said vessel and connected to said conduit in series with said heated portion.

15. Apparatus for preparing compressed gas, comprising an insulated container having an inner vessel provided with a thin-walled receptacle disposed in spaced relation to its inner wall for holding a body of liquefied gas, a withdrawal conduit communicating with both the gas space and liquid space of said vessel leading through the insulation of said container and formed with proximate and remote portions arranged to be heated, flow controlling means interposed in said conduit between said proximate and remote heated portions, and a pipe connection provided with a portion disposed in heat exchanging relation with the liquid in said vessel and having its ends attached respectively to said conduit at each side of said means.

16. The method of preparing compressed gas from a body of liquefied gas held in an insulated container which comprises causing the withdrawn gas material to cool the insulation by its refrigerating effect whereby said gas material becomes heated, then heating withdrawn gas material exteriorly of said container, and using such exteriorly heated gas material to evaporate liquid in said container without substantially warming said insulation.

17. The method of preparing compressed gas from a body of liquefied gas held in an insulated container which comprises causing the withdrawn gas material to cool the insulation by its refrigerating effect whereby said gas material becomes heated, then and upon cessation of the demand for gas material causing the rate of evaporation within said container to fall abruptly.

18. The method of preparing compressed gas from a body of liquefied gas held in an insulated container which comprises abruptly changing the thermal environment internally of said body of liquefied gas upon a change in the demand for gas material, and utilizing the refrigerating effect of gas material withdrawn to maintain a relatively low temperature environment in the insulation externally of said body of liquefied gas.

19. The method of preparing compressed gas from a body of liquefied gas held in an insulated container which comprises abruptly changing the thermal environment internally of said liquefied gas upon an increase and upon a decrease in the demand for gas material, and constantly utilizing the refrigerating effect of gas material withdrawn to maintain a relatively low temperature environment in the insulation externally of said body of liquefied gas.

In testimony whereof I affix my signature.

CHRISTIAN WILHELM PAUL HEYLANDT.